Aug. 24, 1943.    A. L. KRONQUEST    2,327,437
METHOD OF MANUFACTURING SHEET METAL CANS
Filed Aug. 4, 1941
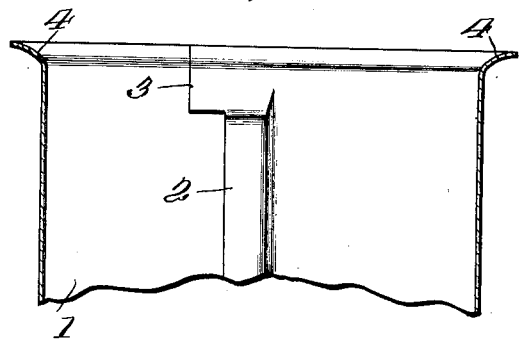
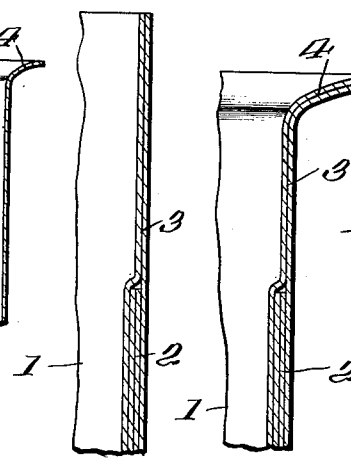
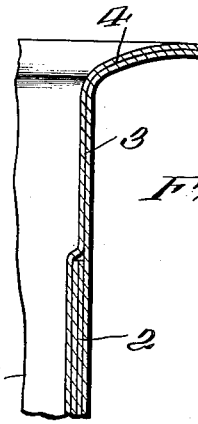
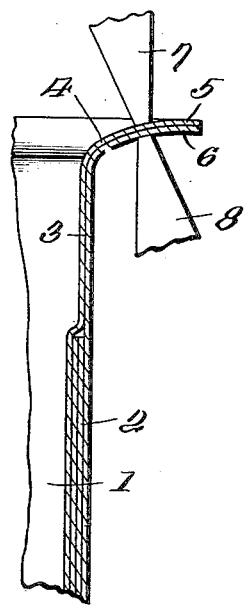
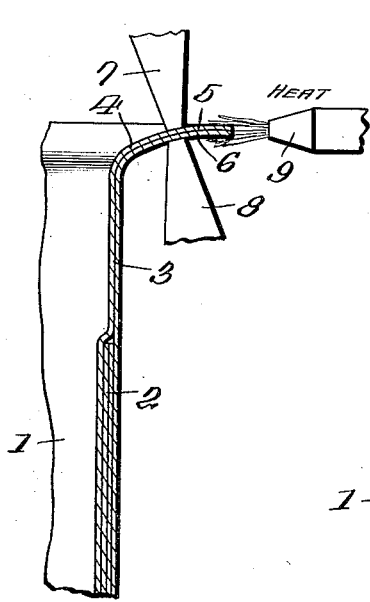
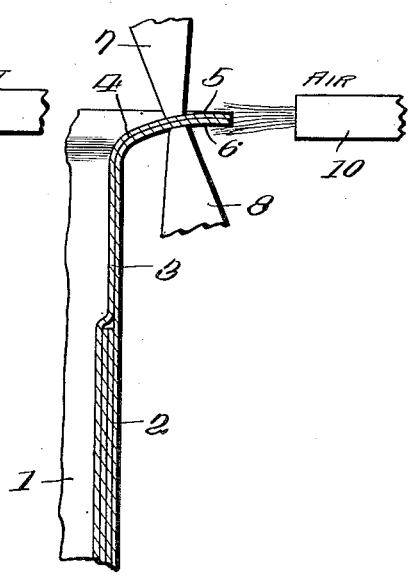
INVENTOR
Alfred L. Kronquest
By Mason & Porter
ATTORNEYS Patented Aug. 24, 1943

2,327,437

UNITED STATES PATENT OFFICE 2,327,437

METHOD OF MANUFACTURING SHEET METAL CANS

Alfred L. Kronquest, Syracuse, N. Y., assignor to Continental Can Company, Inc., New York, N. Y., a corporation of New York Application August 4, 1941, Serial No. 405,388

2 Claims. (Cl. 113—120)

The invention relates to new and useful improvements in a method of making sheet metal cans, and more particularly the type of can wherein the body is flanged and the ends secured thereto by double seaming.

In the manufacture of a can of the above type, the side seam includes lap portions at the ends thereof which are joined by a solder bond and the body is flanged after the solder bonding of the side seam. When the flange is formed the solder bond is put under severe strain at the lap portions which extend out into the flange. Sometimes the solder bond is ruptured during flanging and such a can body can be tested and the imperfections detected and the can body rejected. Occasionally, it happens that this strain placed on the solder bond by flanging of the body will not rupture the solder bond until sometime after the can body has been completed and shipped to the customer. The customer unaware of the ruptured solder bond in the flanged portion of the open top of the can, fills and seals the can and a leak results which causes the product to spoil.

An object of the invention is to provide a method whereby the strain on the solder bond incident to the flanging of the can body is relieved before the finished can is shipped to the customer.

In the drawing which shows the various steps employed in carrying out the method constituting the invention.

Figure 1 is a view in section of the upper portion of a sheet metal can body having a solder bonded lock and lap side seam, which can body is flanged preparatory to receiving a closure end by double seaming the end to the flanged can body.

Figure 2 is a view of the body on the line x—x of Fig. 1 prior to flanging.

Figure 3 is a similar section through the can body after flanging.

Figure 4 is a view showing diagrammatically the gripping of the portions of the lap seam extending into the flange for pressing the same together preparatory to the releasing of the solder bond between the lap sections.

Figure 5 shows heat applied to the gripped and pressed portions of the lap seam in the flange for the melting of the solder uniting said portions.

Figure 6 is a view showing a blast of cooling fluid directed against the portions of the lap in the flange for setting the solder bond before releasing the gripping pressure thereon.

In carrying out the invention, the can body is made in the usual manner by shaping a blank of sheet metal, forming hooks and lap sections which are brought together to form the side seam. The side seam is bumped and solder bonded in the usual way. A can body of this type is illustrated in Fig. 1, wherein the body portion 1 is provided with a side seam having interengaged lock portions 2 and lap portions 3. The can body is flanged as indicated at 4, preparatory to receiving the closure end. Both ends of the body are flanged and the bottom end is seamed thereto by the manufacture of the can. The can thus far completed is shipped to the customer, is filled with the desired product, after which a closure end is applied and secured to the body by double seaming.

In Figure 2, there is shown a portion of a can body with a formed and solder bonded side seam 2, the lap sections being indicated at 3.

In Figure 3 the same view of the can body is presented but in this view the can body is shown as having been flanged as indicated at 4. It is this turning of the lap sections bound together by solder outward into a flange extending at an angle to the body wall that places the solder bond under very severe strain. The overlapped part of the flange is necessarily stretched to a slightly greater extent than the under part because the overlapping part is curved on an arc having a larger radius than the under part. It is this stretching of the metal to a greater extent in one of the lap sections than the other that creates a strain on the solder bond that persists. Sometimes this strain will break the solder bond during flanging. Then again, the strain will not break down the solder bond until long after the can body has been shipped to a customer and stored for use. It is well known that one passing through the store rooms where can bodies are placed awaiting time for use to hear distinct snapping noise which indicates that the solder bond on some can has given away and the solder bond ruptured.

Applicant's method has to do with the releasing of this strain on the solder bond produced by flanging of the can body before the can is shipped to the customer, and even before the can is tested for leaks. The lapping portions 5 and 6 in the flange 4 are gripped between two members 7 and 8 which press on the two lap portions in a very limited area. This leaves a greater portion of the lap sections in the flange exposed. The lap sections thus gripped and pressed upon are subjected to a heating medium which as illustrated in Fig. 5 is in the form of a gas burner 9. Any suitable means may be employed, but the heat should be directed against the portion of the lap seam only which extends out into the flange and which is gripped and pressed upon by the members 7 and 8. This will melt the solder bond and release the lap sections so that they may readjust themselves to the new shaping produced therein by the flanging operation. While the lap portions referred to are still gripped and pressed firmly one against the other, a blast of cooling air indicated at 10 in Fig. 6 is directed against these lap portions and the solder caused to set while these lap portions are pressed together. This will create a new solder bond, joining the two lap sections in the flange and the strain has been completely relieved.

It is understood that the manner of gripping the flange portions may be greatly varied, but it is essential that they shall be pressed upon in a very limited area so that heat may be quickly applied for melting the solder bond and likewise the cooling agent may be quickly applied for setting the solder bond. My improved method may be embodied in a machine which is placed in line with the body maker, the flanger, and the seaming mechanism for joining the bottom end to the can body. It will also be obvious that other ways of heating the solder to melt the solder bond may be provided, and likewise other means for cooling the solder to set the same before the pressure is released from the lap portions of the side seam.

I claim:

1. The method of manufacturing sheet metal cans comprising forming the can body with lap sections at the ends of the side seam, solder bonding the side seam, flanging the can body, pressing the lap portions in the flange together, applying heat to melt the solder for releasing the solder bond between said lap portions and cooling said portions to set the melted solder for re-bonding said lap portions prior to the releasing of the pressure on said lap portions.

2. The method of manufacturing sheet metal cans comprising forming the can body with lap sections at the ends of the side seam, solder bonding said seam, flanging the can body, applying pressure to limited areas in the lap portions in the flange tending to press said lap sections together, applying heat to the lap portions for melting the solder and releasing the solder bond while said portions are pressed together and cooling said portions to set the solder before releasing the pressure.

ALFRED L. KRONQUEST.